(No Model.)
W. E. HARRIS.
PROCESS OF SEPARATING SOLDER FROM TINNED IRON.
No. 419,195. Patented Jan. 14, 1890.
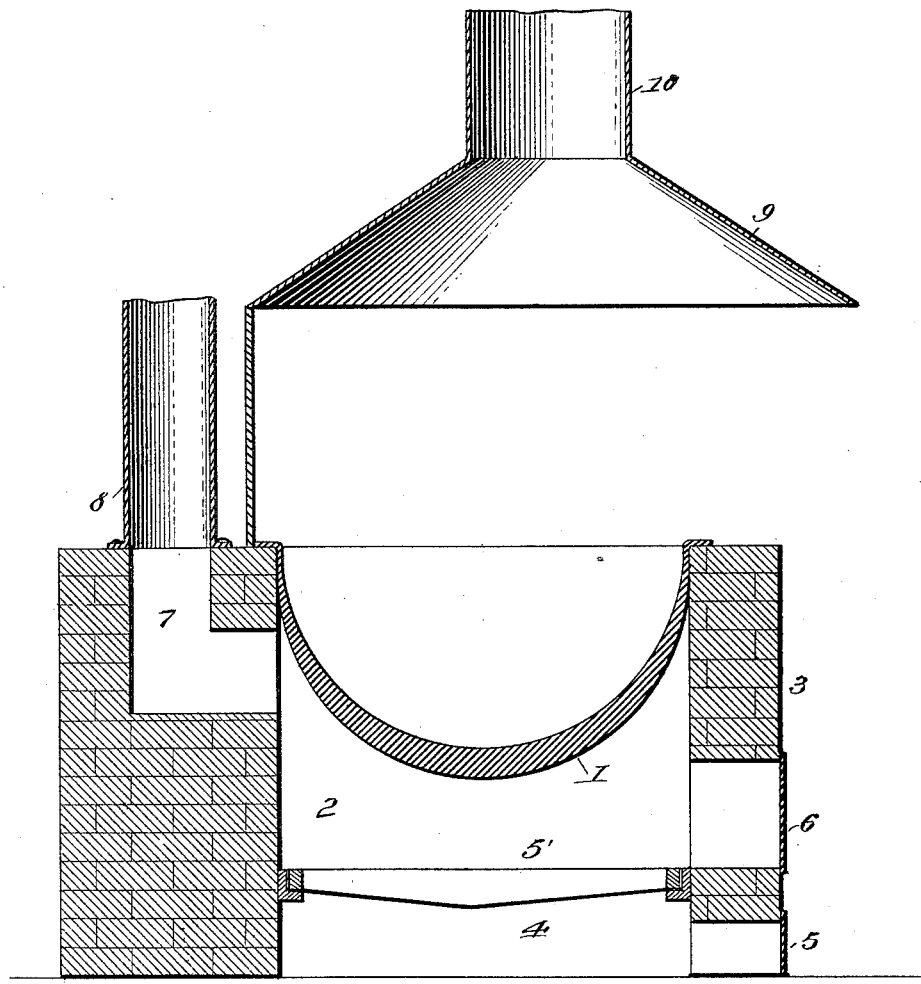
WITNESSES:
INVENTOR:
W. E. Harris
BY Munn & Co
ATTORNEYS.

UNITED STATES PATENT OFFICE.

WILLIAM EDWARD HARRIS, OF NEW YORK, N. Y., ASSIGNOR TO B. B. PURDY, OF SAME PLACE.

PROCESS OF SEPARATING SOLDER FROM TINNED IRON.

SPECIFICATION forming part of Letters Patent No. 419,195, dated January 14, 1890.

Application filed December 23, 1887. Renewed September 25, 1889. Serial No. 324,997. (No model.)

*To all whom it may concern:*

Be it known that I, WILLIAM EDWARD HARRIS, of the city, county, and State of New York, have invented a new and Improved Process of Separating Solder from Tinned Iron Carrying Solder, of which the following is a full, clear, and exact description.

This invention consists in the method of separating solder from tinned iron, as hereinafter described and claimed.

The accompanying drawing illustrates an apparatus which may be employed in carrying out the method.

It has been found desirable to utilize separately the tinned iron and the solder carried thereby in all kinds of receptacles formed of tinned iron and having seams soldered together which have been used and thrown aside. To separate the solder from the tinned iron by melting it without melting the tin on the iron, and at the same time to prevent the solder when melted off of the seams from spreading and adhering to the tinned iron, the following process has been devised: Any suitable form of heating receptacle or vessel may be employed—as, for example, the iron pot 1, which is suspended in the fire-box 2 of a furnace 3, formed with an ash-pit 4, having door 5 and grate 5', fire-box door 6, flue 7, smoke-stack 8, and a sheet-iron hood 9, with a chimney 10 projecting over the open top of pot 1, serving to carry off the smoke and heat arising therefrom.

In carrying out the invention the pot 1 is heated to such a degree as to ignite petroleum. A small quantity of petroleum—as, for example, about a pint—is poured into pot 1, and as soon as it is ignited tinned iron carrying solder is thrown into the pot 1 upon the ignited petroleum. Petroleum is then thrown upon the tinned iron in the pot 1 in sufficient quantity to coat the tinned iron and becomes ignited from the heat already generated in the pot. As the petroleum burns it forms a coating of smut on the tinned iron. The heat generated in the pot 1 from the heating of the pot 1 and the burning of the petroleum becomes sufficient to melt the solder without melting the tin on the iron. The solder upon melting drops off of the seams of the tinned iron into the bottom of the pot 1, the smut formed on the tinned iron by the burning of the petroleum preventing the solder from spreading and adhering to the tinned iron. The smoke and heat arising from the interior of pot 1 are carried off up through chimney 10 of hood 9. As tinned iron carrying solder presents but a small surface of solder in proportion to the surface of tinned iron, the solder only extending over the seams or joints of the tinned iron, if the surface of the tinned iron were not coated with the smut from the burning petroleum the solder, when melted, instead of dropping off the seams of the tinned iron into the bottom of the pot, would flow onto the surface of the tinned iron, adhere to it, and become oxidized by the heat coming in contact with the air. After all the solder on the tinned iron has been melted off and precipitated onto the bottom of the pot 1 the tinned iron is removed and the solder poured out of the pot. The process may then be repeated with more tinned iron carrying solder.

By means of this invention solder may be effectively removed from tinned iron carrying solder and the tinned iron and solder separately utilized.

If desired, the tinned iron carrying solder may be coated with petroleum before being placed in the heating-receptacle. Any suitable form of apparatus other than that herein set forth may be employed to carry out the method and separate solder from tinned iron.

Having thus described my invention, what I claim as new, and desire to secure by Letters Patent, is—

1. The method of separating or recovering solder from the article or material to which it has been applied, which consists in coating the article or material with a substance which will prevent molten solder from adhering to it and melting the solder from said article or material, substantially as set forth.

2. The method of separating or recovering solder from the article or material to which it has been applied, which consists in smutting said article or material and subjecting it to a sufficient degree of heat to fuse the solder, substantially as set forth.

3. The method of separating solder from tinned iron, which consists in coating tinned iron carrying solder with petroleum, burning the petroleum on the tinned iron in a receptacle, thereby smutting the tinned iron, melting the solder, and causing the molten solder to run off from the smutted metal, and separately removing the tinned iron and the solder from the receptacle, substantially as shown and described.

4. The method of separating or recovering solder from tinned iron, which consists in placing the same in a heated vessel containing burning petroleum, then throwing petroleum over said tinned iron and burning it, thereby coating the article with smut and fusing the solder, substantially as set forth.

WILLIAM EDWARD HARRIS.

Witnesses:
A. J. STEERS,
JOHN MCGREEVEY.